May 24, 1949.  I. JANKOVICH  2,471,372
PLIERS WITH DETACHABLE END JAWS
Filed Sept. 26, 1945
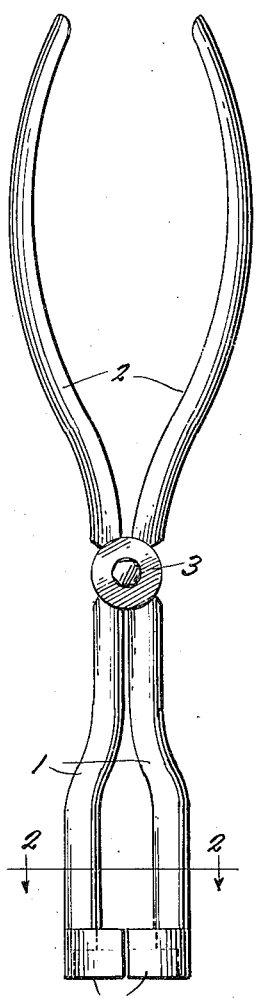
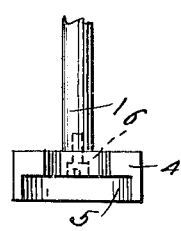
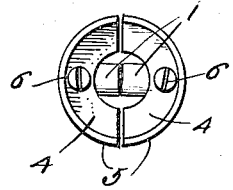
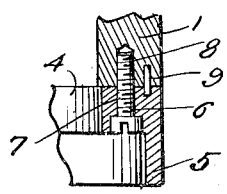
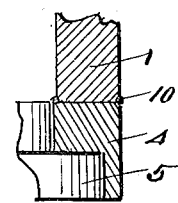
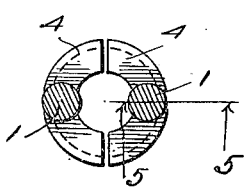
INVENTOR
IVAN JANKOVICH
BY
ATTORNEY Patented May 24, 1949

2,471,372

UNITED STATES PATENT OFFICE 2,471,372

PLIERS WITH DETACHABLE END JAWS

Ivan Jankovich, Kenosha, Wis.

Application September 26, 1945, Serial No. 618,714

1 Claim. (Cl. 81—52)

This invention relates to pliers and more particularly to a pair of pliers for removing and applying shoes of brakes for motor vehicles, it being one object of the invention to provide pliers so formed that by their use bolts for holding brake shoes in place may be very easily removed or tightened after being set in place.

Another object of the invention is to provide a pair of pliers having specially formed jaws which cooperate to form a circular socket in which a nut or the head of a bolt may be firmly gripped and held while applying or removing a bolt mounting a brake shoe in a brake drum.

Another object of the invention is to so locate the jaws with respect to ends of arms of the pliers that when the pliers are in use they may be disposed longitudinally of the bolt for gripping engagement therewith instead of transversely of the bolt and thus allow a bolt or nut in a confined space to be easily gripped and turned.

Another object of the invention is to provide pliers which are simple in construction and very strong.

The invention is illustrated in the accompanying drawings wherein:

Fig. 1 is a side view of the improved pliers.

Fig. 2 is a view taken along the line 2—2 of Figure 1.

Fig. 3 is a view looking at the jaws at the front end of the pliers.

Fig. 4 is a view looking at the inner side of one jaw.

Fig. 5 is a fragmentary sectional view taken along line 5—5 of Figure 2.

Fig. 6 is a view similar to Figure 5 showing a modified construction.

The improved pliers constituting the subject matter of this invention has arms 1 which are formed of steel or other strong metal and handles 2 formed integral with the arms, and referring to Figure 1 it will be seen that the arms are pivotally connected with each other by a joint 3 and that the handles 2 extend rearwardly from this joint. The arms are circular in cross section, as shown in Figure 2, and are bent intermediate their lengths so that forward portions of the arms are spaced from each other. At their front ends the arms carry heads or jaws 4 which are also formed of steel and semicircular in shape so that when the jaws are brought together with their end faces confronting each other the jaws will form a circular socket open at its front. The flanges 5 of the jaws form a circular wall for the socket and allow a nut or bolt head to be firmly gripped when pressure is applied to the handles to force the arms towards each other and move the heads or jaws to a gripping position. Each head is secured to the arm carrying it by a screw 6 which passes through an opening 7 formed in the head and into a threaded socket 8 formed in the arm, a dowel pin 9 being used to prevent the head from turning about the screw. By so mounting the head or jaw it may be removed and another applied if the one in use becomes worn or broken or jaws of a different shape may be substituted in place of those applied to the arms. Instead of securing the heads to the arms by screws they may be rigidly secured to the arms by solder or fusing, as shown at 10 in Figure 6.

Having thus described the invention, what is claimed is:

Pliers comprising members pivoted to each other and having rearwardly extending handles and forwardly extending arms, the arms being solid and having forward portions spaced from each other and formed with longitudinally extending threaded sockets leading from their front ends, jaws at front ends of said arms cooperating with each other to form an annular nut-receiving socket having a bolt receiving opening at the center, each jaw having a solid arcuate body and a forwardly extending flange along its outer marginal edges, said jaws being disposed transversely of the arms with portions projecting from opposite sides thereof and each having its body formed midway its ends with an opening registering with the threaded socket of the arm against which the jaw fits, and screws passed through the openings of the jaws and screwed into the threaded sockets to firmly hold the jaws against front ends of the arms in detachable engagement therewith.

IVAN JANKOVICH.

REFERENCES CITED

The following references are of record in the file of this patent:

UNITED STATES PATENTS

| Number | Name | Date |
|---|---|---|
| 120,947 | Davis | Nov. 14, 1871 |
| 292,643 | Friend | Jan. 29, 1884 |
| 321,133 | Osborne | June 30, 1885 |
| 510,182 | Martini | Dec. 5, 1893 |
| 768,161 | Thompson | Aug. 23, 1904 |
| 1,484,222 | Kightlinger | Feb. 19, 1924 |
| 1,870,133 | Myers | Aug. 2, 1932 |
| 1,910,750 | Clark | May 23, 1933 |
| 2,130,748 | Suter | Sept. 20, 1938 |